(12) United States Patent
Takata et al.

(10) Patent No.: US 7,461,958 B2
(45) Date of Patent: Dec. 9, 2008

(54) LAMP HOLDING APPARATUS, BACKLIGHT DEVICE FOR DISPLAY DEVICE INCLUDING SAME, DISPLAY DEVICE INCLUDING SAME AND LIQUID CRYSTAL DISPLAY DEVICE INCLUDING BACKLIGHT DEVICE FOR DISPLAY DEVICE

(75) Inventors: Yoshiki Takata, Suzuka (JP); Hiroki Azuma, Tsu (JP); Tatsuya Kudari, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/560,272

(22) Filed: Nov. 15, 2006

(65) Prior Publication Data
US 2007/0070652 A1    Mar. 29, 2007

Related U.S. Application Data

(63) Continuation of application No. PCT/JP2005/020476, filed on Nov. 8, 2005.

(30) Foreign Application Priority Data
Nov. 30, 2004  (JP) .............................. 2004-347325

(51) Int. Cl.
*F21V 17/06* (2006.01)
(52) U.S. Cl. .......................... 362/433; 362/634; 349/60
(58) Field of Classification Search ................. 362/433, 362/632–634; 349/58, 60
See application file for complete search history.

(56) References Cited

U.S. PATENT DOCUMENTS 7,070,313 B2 *   7/2006  Kim et al. .................... 362/561
2004/0257792 A1  12/2004  Yu et al.

(Continued)

FOREIGN PATENT DOCUMENTS

EP           1515083 A1     3/2005

(Continued)

OTHER PUBLICATIONS

Official Communication issued in the corresponding International Application No. PCT/JP2005/020476, mailed on Jan. 24, 2006.

(Continued)

*Primary Examiner*—Sandra O'Shea
*Assistant Examiner*—Jason Moon Han
(74) *Attorney, Agent, or Firm*—Keating & Bennett, LLP

(57) ABSTRACT

A lamp holding apparatus for mounting a lamp to a lamp mounting member includes a mounting plate provided with a locking portion which protrudes to a base side, inserted into a mounting hole provided at the base and is lockable to a peripheral edge of a back side thereof. The mounting plate is provided with a pin which protrudes to an opposite side from the base side and is capable of being gripped by an operator at a time of being attached to and detached from the base. The locking portion is disposed at a position corresponding to a back side of the pin. As a result, when the locking portion is inserted into the mounting hole while gripping the pin, both the locking portion and the mounting hole are easily positioned. Thus, at a time of insertion, bending forces are reduced.

26 Claims, 12 Drawing Sheets

U.S. PATENT DOCUMENTS

2005/0225992 A1   10/2005   Idei et al.

FOREIGN PATENT DOCUMENTS

| | | |
|---|---|---|
| JP | 05-67021 U | 9/1993 |
| JP | 10-326517 A | 12/1998 |
| JP | 11-329040 A | 11/1999 |
| JP | 48-102466 A | 8/2001 |
| JP | 2001-210126 A | 8/2001 |
| JP | 2002-268573 A | 9/2002 |
| JP | 2003-346541 A | 12/2003 |
| JP | 2004-039476 A | 2/2004 |
| JP | 2004-158224 A | 6/2004 |
| JP | 2004-158324 A | 6/2004 |

OTHER PUBLICATIONS

Official communication issued in the counterpart Japanese Application No. 2006-520459, mailed on Feb. 27, 2007.

Official communication issued in the counterpart Japanese Application No. 2006-520459, mailed on Nov. 28, 2006.

Hiroki Azuma et al.; "Lamp Holding Apparatus, Lighting Device for Display Device Including the Same, Display Device Including Same and Liquid Crystal Display Device Including Lighting Device for Display Divice"; U.S. Appl. No. 11/560,259, filed Nov. 15, 2006.

Kentaroh Aoki et al.; "Lighting Device for Display Device and Display Device"; U.S. Appl. No. 11/557,345, filed Nov. 7, 2006.

Yoshiki Takata et al.; "Lamp Holder Backlight Device Using the Same, and Display Using the Same"; U.S. Appl. No. 11/720,175, filed May 24, 2007.

Kentaroh Aoki et al.; "Illuminating Apparatus for Displaying Apparatus and Displaying Apparatus"; U.S. Appl. No. 11/719,612, filed May 17, 2007.

Official communication issued in the counterpart European Application No. 05803508.0, mailed on Aug. 16, 2007.

Official communication issued in counterpart Japanese Application No. 2006-520463, mailed Nov. 28, 2006.

Official communication issued in counterpart Japanese Application No. 2006-520463, mailed on Feb. 27, 2007.

\* cited by examiner

LAMP HOLDING APPARATUS, BACKLIGHT DEVICE FOR DISPLAY DEVICE INCLUDING SAME, DISPLAY DEVICE INCLUDING SAME AND LIQUID CRYSTAL DISPLAY DEVICE INCLUDING BACKLIGHT DEVICE FOR DISPLAY DEVICE

CROSS REFERENCE TO RELATED APPLICATION

This application claims priority from Japanese Patent Application No. 2004-347325 filed Nov. 30, 2004, the entire contents of which are hereby incorporated herein by reference.

BACKGROUND OF THE INVENTION

1. Field of the Invention

The present invention relates to a lamp holding apparatus, a backlight device for a display device including the lamp holding apparatus, a display device including the backlight device, and a liquid crystal display device including a backlight device for a display device.

2. Description of the Related Art

Since a liquid crystal panel used in a liquid crystal display device of, for example, a liquid crystal television or the like is not self-luminous, it requires a separate backlight device as an external lamp. The backlight device is installed at a back side of the liquid crystal panel, and generally includes a base made of a metal with a surface on a liquid crystal panel side opened, a number of cold-cathode tubes accommodated in the base as lamps, and a number of optical members (diffusion sheet and the like) arranged on the opening portion of the base and efficiently releasing light emitted by the cold-cathode tubes to the liquid crystal panel side, and includes lamp clips for holding the cold-cathode tubes, which have a slim elongated tube shape, with respect to the base.

As one example of the lamp clip described above, the lamp clip disclosed in Japanese Patent Laid-Open No. 2001-210126 is known. This lamp clip is made of a synthetic resin, and includes a mounting plate arranged along an inner surface of a base, a locking portion which protrudes to a base side from the mounting plate and is inserted into a mounting hole of the base and is lockable to its peripheral edge, a lamp holding portion which protrudes to an opposite side from the locking portion from the mounting plate and is capable of holding a peripheral surface of a cold-cathode tube so as to surround it, and a pin which protrudes in the same direction as the lamp holding portion from the mounting plate. The pin protrudes to a larger extent than the lamp holding portion, and therefore, when the lamp clip is mounted to the base, an operator performs a mounting operation by gripping the pin.

Incidentally, when a mounting operation is performed, it is necessary to insert the locking portion into a mounting hole of the base while gripping the pin. However, since in the above described lamp clip, the pin is arranged at an intermediate position between both the locking portions, and both of them are disposed at the positions separated from each other, the locking portion is difficult to position with respect to the mounting hole, in addition to which, the mounting plate easily bends when the locking portion is inserted into the mounting hole, and therefore, operability is not favorable and problems occur.

SUMMARY OF THE INVENTION

In order to overcome the problems described above, preferred embodiments of the present invention provide a lamp holding apparatus for mounting a lamp to a lamp mounting member including a mounting plate which is applied to the lamp mounting member, a plurality of lamp holding portions provided at a side opposite from the lamp mounting member of the mounting plate to hold the lamp, a locking portion which protrudes to the lamp mounting member side from the mounting plate and is inserted into a mounting hole provided in the lamp mounting member so as to be lockable to a peripheral edge of its back side, and a gripping portion which is located between the lamp holding portions on the mounting plate, has a greater height dimension from the mounting plate than the lamp holding portions, protrudes to a side opposite from the lamp mounting member side, and is capable of being gripped by an operator at a time of being attached and detached to and from the lamp mounting member, and the locking portion is disposed at a position corresponding to a back side of the gripping portion, or a position in a vicinity thereof.

With this unique construction, the locking portion is disposed at the position corresponding to the back side of the gripping portion or the position in the vicinity thereof, and therefore, as compared with the lamp holding apparatus in which both of them are disposed by being deviated from each other as in the prior art, both of them are easily positioned when the locking portion is inserted into the mounting hole while gripping the gripping portion. As a result, bending of the mounting plate is prevented from occurring at a time of insertion.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A preferred embodiment of the present invention will be described with reference to FIGS. 1 to 8. In this preferred embodiment, a lamp clip 20 used in a backlight device 12 of a liquid crystal display device 10 will be shown as an example. A vertical direction will be described with each of the drawings as the reference and a lateral direction will be described with FIG. 3 as the reference hereinafter.

Figure 1:
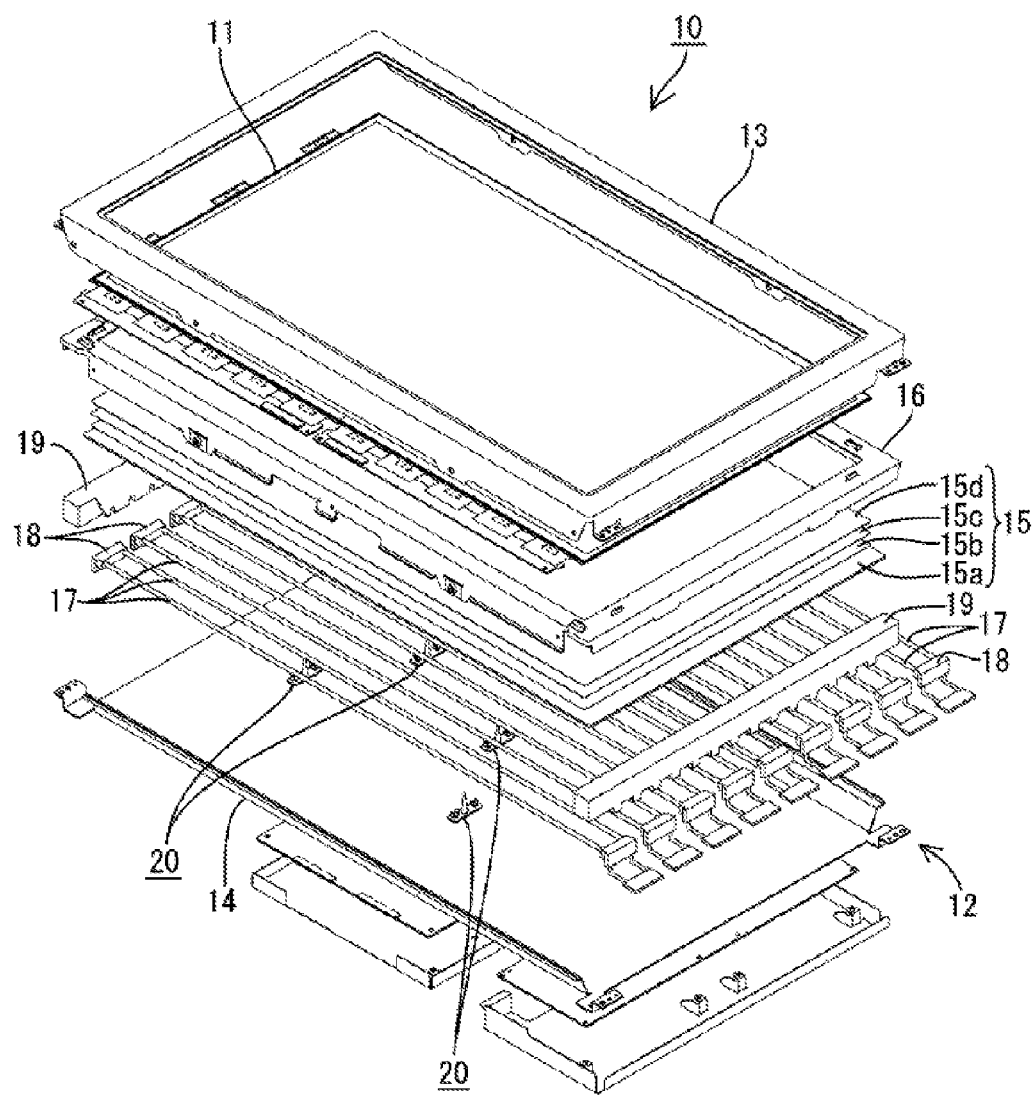
FIG. 1 is an exploded perspective view showing an outline of a liquid crystal display according to a preferred embodiment of the present invention.
Figure 2:
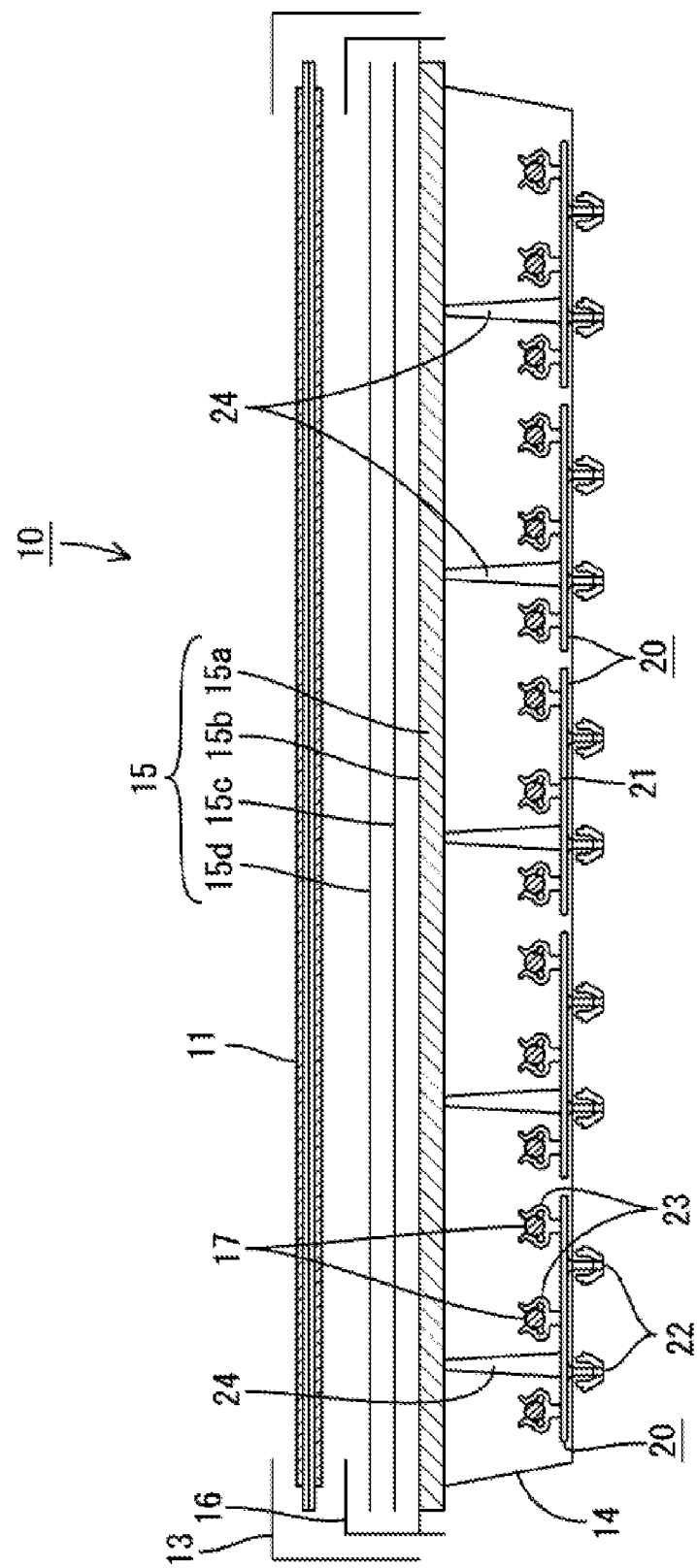
FIG. 2 is a sectional view showing an outline of the liquid crystal display device.

First, an outline of the entire liquid crystal display device 10 will be described. The liquid crystal display device 10 generally preferably includes a liquid crystal panel 11 having a substantially rectangular shape, and the backlight device 12 that is an external light source, and the liquid crystal panel 11 and the backlight device 12 are integrally held by a bezel 13 or the like, as shown in FIGS. 1 and 2. The liquid crystal panel 11 that is a display panel has a construction in which a pair of glass sheets are bonded to each other with a predetermined gap therebetween, and liquid crystal is sealed between the glass sheets. One of the glass sheets is provided with switching elements (for example, TFT) connected to source wiring and gate wiring which are substantially perpendicular to each other and the other glass sheet is provided with pixel electrodes of R, G and B, respectively, arranged in a matrix configuration.

Next, the backlight device 12 will be described. The backlight device 12 includes a metal base 14 preferably having a substantially rectangular box shape with a top surface side opened, a plurality of optical members 15 mounted to cover the opening of the base 14 (a diffusion plate 15a, a diffusion sheet 15b, a lens sheet 15c and an optical sheet 15d in the sequence from the lower side in the drawing), a frame 16 for holding these optical members 15 on the base 14, cold-cathode tubes 17 that are lamps accommodated in the base 14, a rubber (for example, silicon rubber) holder 18 for holding both end portions of the cold-cathode tubes 17, lamp holders 19 that collectively cover the cold-cathode tube 17 group and the holder 18 group, and lamp clips 20 for holding intermediate portions except for both end portions in the cold-cathode tubes 17.

The cold-cathode tube 17 preferably has a slim elongated tube shape, and a number of cold-cathode tubes 17 are accommodated in the base 14 in the state in which their length direction (axial direction) is caused to coincide with the long side direction of the base 14 and a plurality of the cold-cathode tubes 17 are arranged in parallel with each other. The outside diameter dimension of the cold-cathode tube 17 is, for example, preferably about 3 mm to about 4 mm, for example, but it sometimes increases and decreases in the tolerance range due to an error in manufacture or as desired.

The lamp clip 20 is preferably made of a synthetic resin (for example, polycarbonate), includes a mounting plate 21 to be applied to a wall surface of a bottom portion of the base 14, and has a construction in which locking portions 22, lamp holding portions 23, a pin 24 and the like at the mounting plate 21. A plurality of the lamp clips 20 are mounted to the base 14 so as to be able to hold each of the cold-cathode tubes 17 preferably at two spots or three spots differing in the length direction. The surface of the entire lamp clip 20 is preferably white in color, for example, so as to make it difficult to shield and reflect the light emitted from the cold-cathode tube 17.

Figure 3:
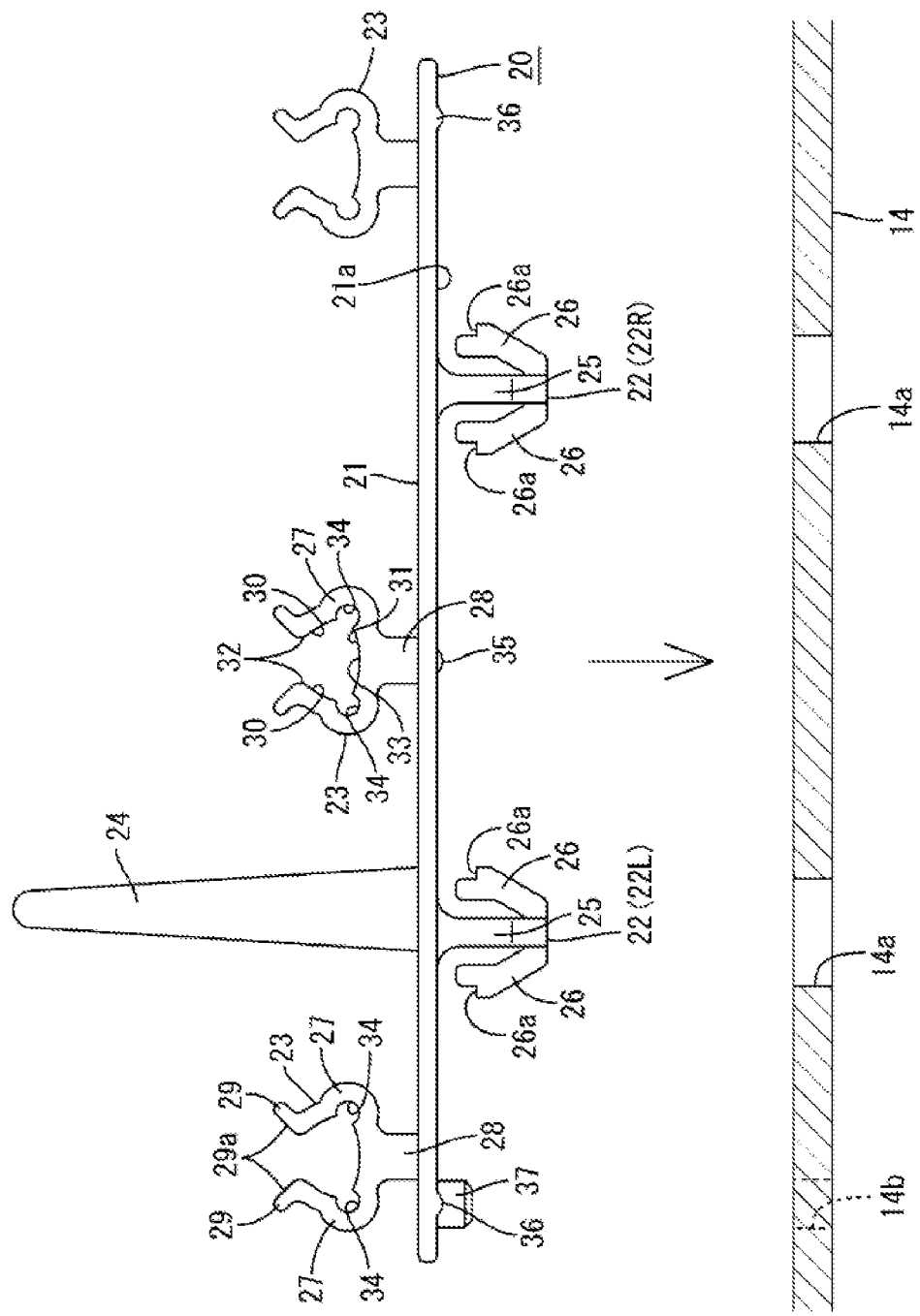
FIG. 3 is a sectional front view showing a state before a lamp clip is mounted to a base.
Figure 5:
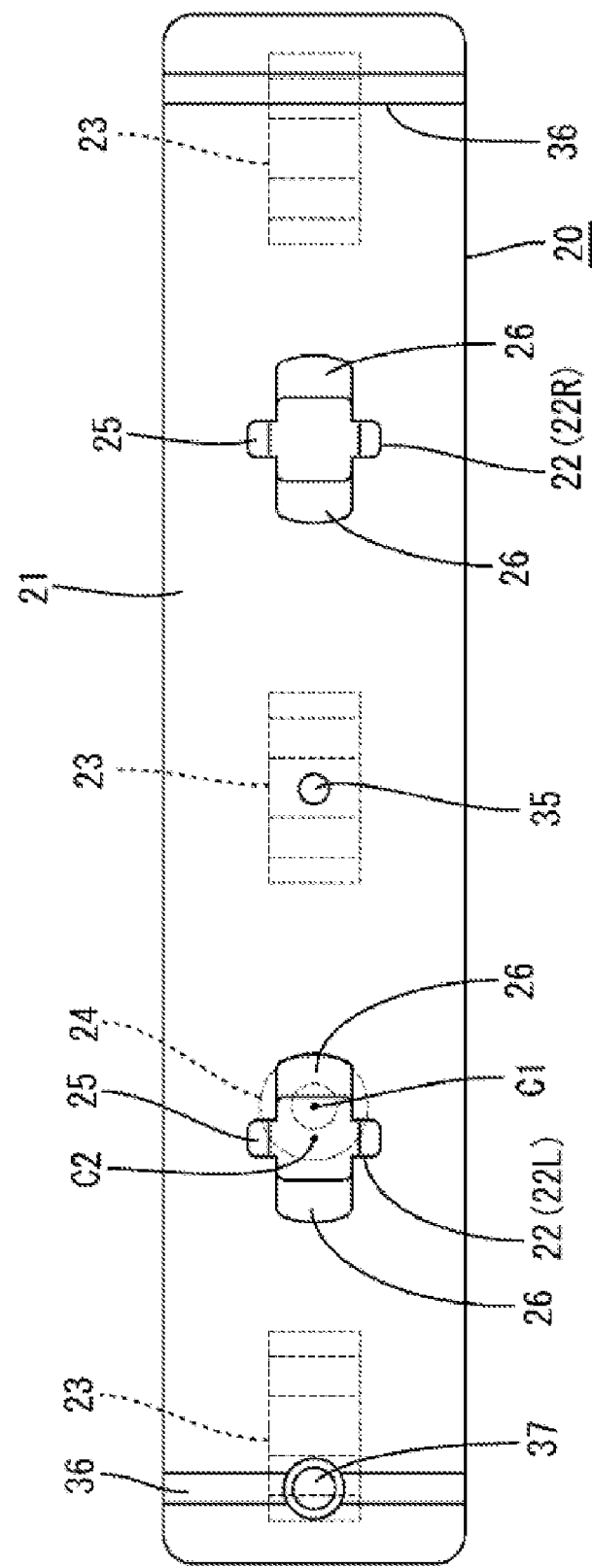
FIG. 5 is a bottom view of the lamp clip.
Figure 6:
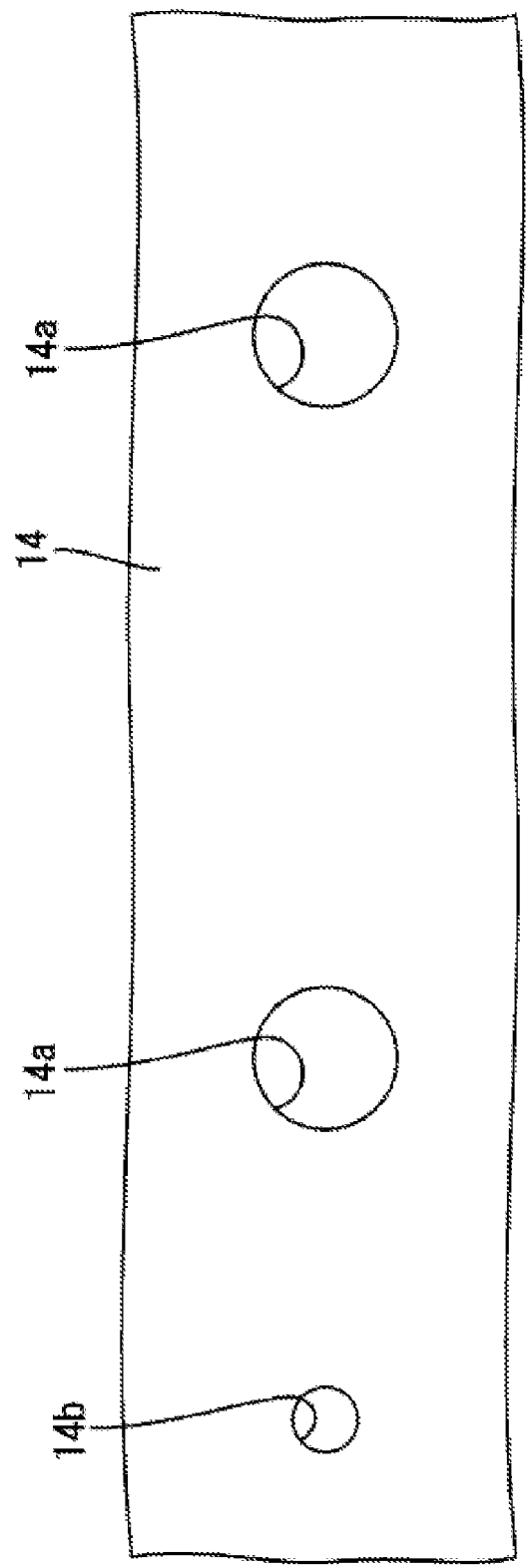
FIG. 6 is a partial plane view of a base.

The mounting plate 21 preferably has a substantially rectangular slim elongated shape extending along the short side direction of the base 14 (direction that is substantially perpendicular to the length direction of the cold-tube cathode 17). The locking portion 22 for fixing the lamp clip 20 to the base 14 is provided at a bottom surface 21a (the opposing surface to the base 14, the attached surface to the base 14) of the mounting plate 21 so as to protrude downward (base 14 side) as shown in FIG. 3. A pair of locking portions 22 are preferably provided on the mounting plate 21, and both the locking portions 22 are arranged at locations spaced substantially equidistantly from both end positions of the mounting plate 21 with respect to the long side direction of the mounting plate 21, and are both preferably arranged at central positions with respect to the short side direction of the mounting plate 21, as shown in FIGS. 3 and 5.

Figure 8:
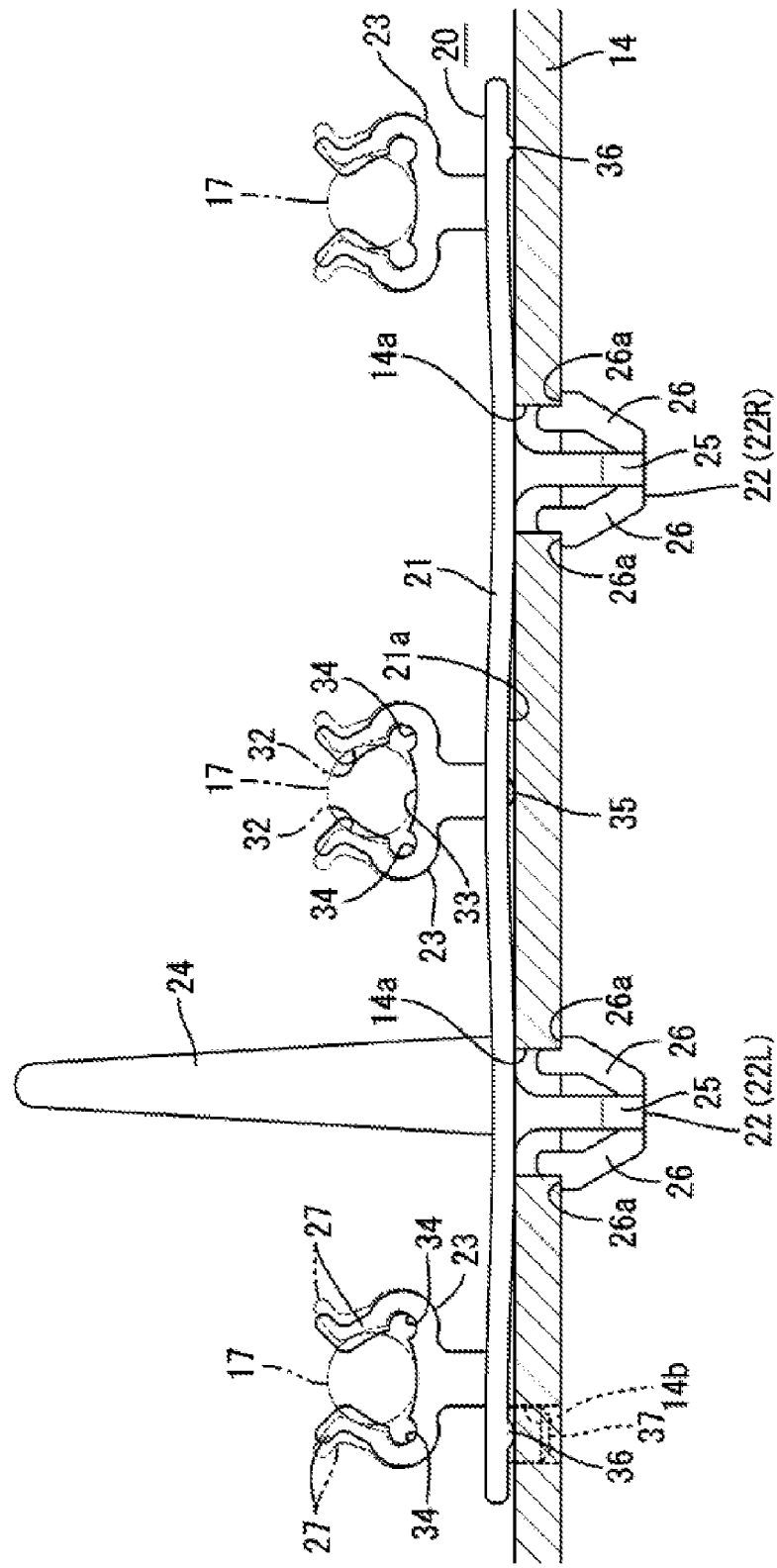
FIG. 8 is a sectional front view showing a state in which the lamp clip is mounted to the base.

The locking portion 22 preferably includes a base portion 25 arranged to hang from the bottom surface 21a of the mounting plate 21, and a pair of elastic locking pieces 26 extending diagonally upward from a tip end portion of the base portion 25 (to the mounting plate 21 side while separating from the base portion 25). The base portion 25 preferably has a slim substantially rectangular elongated shape extending along the short side direction of the mounting plate 21 in the bottom view (FIG. 5), and a root portion connected to the mounting plate 21 having such a shape that is preferably thicker as it is closer to the mounting plate 21. Both the elastic locking pieces 26 preferably have an open sided configuration connected to both side surfaces at the side of a long side in the tip end portion of the base portion 25, and are elastically deformable along the direction to contact to and separate from the base portion 25 with their connecting portions as the support points. The locking portion 22 is capable of being inserted into each mounting hole 14a which is provided at the corresponding position in the base 14 so as to penetrate through it, a step portion formed at the tip end portion in the elastic locking piece 26 is capable of being locked to the peripheral edge at the back side in the mounting hole 14a, and this becomes a locking surface 26a that is locked to the base 14 (FIG. 8). Each of the mounting holes 14a preferably has a substantially circular shape.

The locking surface 26a of the elastic locking piece 26 and the bottom surface 21a of the mounting plate 21 are arranged to oppose each other in a state in which they are separated from each other as shown in FIG. 3, and a distance between both the surfaces 21a and 26a is set to be a little larger than the plate thickness dimension of the base 14 in consideration of an error in manufacture of the lamp clip 20. In detail, the distance between both the surfaces 21a and 26a increases and decreases within the tolerance range due to an error in manufacture of the lamp clip 20, but by setting it as described above, the distance between both the surfaces 21a and 26a becomes about the same as the plate thickness dimension of the base 14 and mounting to the base 14 is allowed even when the distance between both the surfaces 21a and 26a is at the minimum value of the tolerance range.

Figure 4:
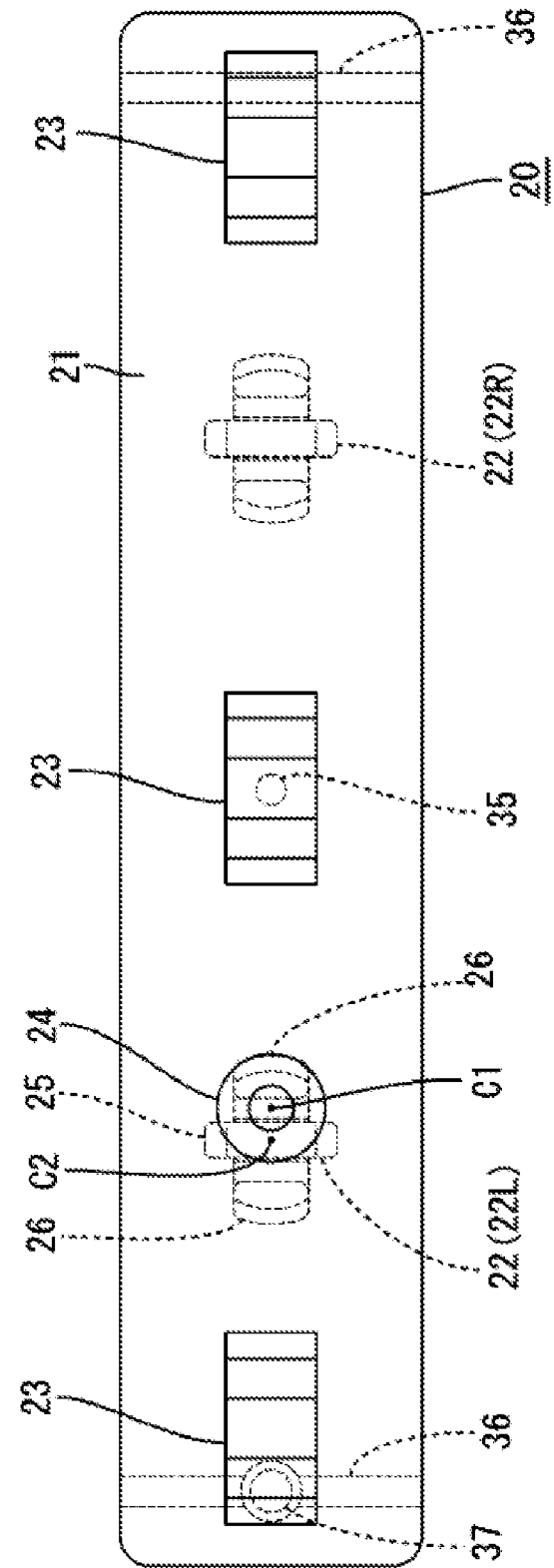
FIG. 4 is a plan view of the lamp clip.

On the top surface of the mounting plate 21 (opposing surface to the cold-cathode tube 17, a surface at the opening side of the base 14), a lamp holding portion 23 for holding the intermediate portion of the cold-cathode tube 17 except for both end portions in the length direction is arranged to protrude upward. Three lamp holding portions 23 in total, for example, are preferably provided at positions which are spaced substantially equidistantly from both end positions in the long side direction of the mounting plate 21 (in detail, positions near to an outside from the locking portions 22) and at a substantially central position, as shown in FIGS. 3 and 4. Each of the lamp holding portions 23 is placed at a central position with respect to the short side direction of the mounting plate 21.

The lamp holding portion 23 is preferably capable of surrounding the peripheral surface of the cold-cathode tube 17 as a whole as shown in FIG. 2, and is preferably formed into a bottomed annular shape opened upward to allow attachment and detachment of the cold-cathode tube 17. In detail, as shown in FIG. 3, the lamp holding portion 23 preferably includes a pair of arm portions 27 connected at root portions of each other, and has the construction in which both arm portions 27 are connected to a connecting portion 28 vertically extending from the top surface of the mounting plate 21 so as to be able to hold the cold-cathode tube 17 at a position raised by a predetermined height from the mounting plate 21. Both the arm portions 27 preferably have open-sided shapes in which root portions protrude outside along a substantially horizontal direction (opposite side from each other), and thereafter, extending diagonally upward to an inside (direction to be close to each other), and have a symmetrical shape relative to each other. In both the arm portions 27, the space between the tip end portions is a space which is narrower than the minimum outside diameter dimension of the tolerance range in the cold-cathode tube 17. Through this clearance, attachment and detachment of the cold-cathode tube 17 are allowed, and both the arm portions 27 are capable of elastically deforming to open (elastically deformable while expanding the clearance between the tip end portions) with the attachment and detachment.

Guide portions 29 protruding diagonally upward to an outside to separate from each other are respectively provided at outer surfaces of the tip end portions of both the arm portions 27. Guide surfaces 29a, defining inner surfaces of both the guide portions 29, each preferably have a tapering shape, and a distance between both the guide surfaces 29a becomes gradually large as it goes upward. Specifically, an acceptance width for the cold-cathode tube 17 in the lamp holding portion 23 gradually increases toward a front side in the mounting direction, and therefore, mounting of the cold-cathode tube 17 is facilitated. Both the guide surfaces 29a are arranged to make a substantially right angle with each other.

Inner peripheral surfaces of both the arm portions 27 include three gentle arc surfaces 30 and 31 which are located at a root portion and in the vicinity of both tip end portions, and when virtual tangential lines of the respective arc surfaces 30 and 31 are connected, an equilateral triangle is formed. The respective arc surfaces 30 and 31 are formed to be gentler than a peripheral surface of the cold-cathode tube 17, and in other words, curvatures of the respective arc surfaces 30 and 31 are preferably smaller than the curvature of the peripheral surface of the cold-cathode tube 17. Among the respective arc surfaces 30 and 31, as for both the arc surfaces 30 at the tip end side of both the arm portions 27, the tip end portions are made point contact portions 32 point-contactable to the cold-cathode tube 17 with respect to the circumferential direction, and as for the arc surface 31 at the root side, its central portion is made a point contact portion 33 point-contactable to the cold-cathode tube 17 with respect to the circumferential direction. Both the point contact portions 32 at the tip end sides of both the arm portions 27 make it possible to press the cold-cathode tube 17 from above, i.e., from the removing direction of cold-cathode tube 17. The arc surface 31 of the root portions of both the arm portions 27 are constructed so that a central portion in its circumferential direction is the deepest, and therefore, it is made possible to guide the cold-cathode tube 17 to be mounted to the central position. In the mounting state, each of the point contact portions 32 and 33 is located at the vertex point of the isosceles triangle or the equilateral triangle though it differs depending on the thickness of the cold-cathode tube 17 (see FIG. 8). A connecting portion of the arc surface 30 at the tip end side in the arm portion 27 and the guide surface 29a preferably has a round shape.

In the lamp holding portion 23, both the arm portions 27 elastically deform to open a little in the mounting state and the respective point contact portions 32 and 33 have a size so as to be able to contact firmly to the peripheral surface of the cold-cathode tube 17 to be able to hold it without rattling, even when the thickness of the cold-cathode tube 17 to be mounted is at the minimum value in the tolerance range.

Recessed portions 34 are provided at the inner peripheral surfaces (opposing surfaces to the cold-cathode tube 17) in both the arm portions 27. In detail, the recessed portion 34 is placed between the adjacent arc surfaces 30 and 31 (between the tip end portion and the root portion of the arm portion 27, namely, the connecting region with respect to the connecting portion 28) of the inner peripheral surface of the arm portion 27, and preferably has an arc shape that is more acute than the respective arc surfaces 30 and 31 (with a relatively large curvature, with a relatively small radius of curvature). The recessed portion 34 is preferably formed over the entire width of the arm portion 27, and is formed to be deeper toward a central portion in the circumferential direction. An outer peripheral surface of the arm portion 27 where the recessed portion 34 is provided (the surface at the opposite side from the opposing surface to the cold-cathode tube 17) is formed to bulge outwardly by the amount by which the arm portion 27 is recessed by the recessed portion 34. In other words, in the direction separate from the cold-cathode tube 17, whereby the arm portion 27 is formed to have substantial uniform thickness over substantially the entire length. The arm portion 27 is allowed to bend to deform to open with the region at the root side of the portion where the recessed portion 34 is provided as the support point, so that the tip end portion displaces in the direction to separate from the peripheral surface of the cold-cathode tube 17. Thereby, as compared with the situation where the recessed part is not provided, the elastic force of the arm portion 27, in other words, the operational force required to deform the arm portion 27 to open is reduced. Further, in the arm portion 27, a total surface distance (arm length) from the root portion to the tip end portion (being a free end) becomes large as a result of the portion provided with the recessed portion 34 bulging outwardly.

On the top surface of the mounting plate 21, a pin 24 that is capable of abutting the optical member 15 (a diffusion plate 15a at the lowermost side) is arranged to protrude upward (the same direction as the lamp holding portion 23, the opposite side from the base 14 side) as shown in FIG. 3 and FIG. 4. The pin 24 preferably has a tapering shape gradually decreasing in a diameter dimension as it approaches a tip end side from the root side (separating from the cold-cathode tube 17) with a substantially circular section, into a substantially conical shape. A tip end portion of the pin 24 preferably has a rounded shape, so as to be able to support the diffusion plate 15a that has the optical member 15 with it from below, and thereby, the diffusion plate 15a can be prevented from hanging down and displacing in the horizontal direction. The height dimension of the pin 24 is preferably larger than the lamp holding portion 23, and is set at, for example, about three times as large as the lamp holding portion 23. Therefore, when the lamp clip 20 is attached to and detached from the base 14, an operator can perform the operation by gripping the pin 24. The outside diameter dimension of the pin 24 is preferably smaller than the length dimension at the side of the long side in the base portion 25 of the locking portion 22, and is preferably larger than a length dimension at the side of the short side of the base portion 25.

The pin 24 is preferably disposed at an intermediate position between the left end lamp holding portion 23 and the central lamp holding portion 23 with respect to the long side direction of the mounting plate 21, and at a central position with respect to a short side direction of the mounting plate 21. A left side locking portion 22L is placed at the position corresponding to the back side of the mounting plate 21 with respect to the pin 24 (hereinafter, when the left and right locking portions are distinguished, a subscript L is added to a reference numeral at the left side, and a subscript R is added as for the right side). These pins 24 and the locking portion 22L have center points C1 and C2 that are deviated from each other, but are disposed so that most parts of them overlap each other in the surface direction of the mounting plate 21.

Explaining it in more detail, the center point C1 of the pin 24 and the center point C2 of the locking portion 22L are preferably set at the same positions with respect to the short side direction of the mounting plate 21, but are disposed to be slightly deviated with respect to the longitudinal direction. The center point C1 of the pin 24 is positioned at an inner side from the outer peripheral edge with respect to the locking portion 22L and with respect to the surface direction of the mounting plate 21 (more accurately, at the outer side from the outer peripheral edge of the base portion 25, but at an inner side from an outer peripheral edge of the elastic locking piece 26 at the right side), as shown in FIG. 4. Meanwhile, the center point C2 of the locking portion 22L is positioned at an inner side from the outer peripheral edge of the root portion relative to the pin 24 with respect to the surface direction of the mounting plate 21, as shown in FIG. 5. The outer peripheral edge of the root portion of the pin 24 is arranged to span the entire region of the base portion 25 and the elastic locking piece 26 at the right side of the locking portion 24L with respect to the longitudinal direction of the mounting plate 21. Specifically, the pin 24 is disposed so that substantially the entire range of it overlaps the locking portion 22L with respect to the surface direction of the mounting plate 21. With such arrangement, even when a force which displaces the pin 24 and the locking portion 22L relatively in an up and down direction (direction that is substantially perpendicular to the surface direction of the mounting plate 21), that is, when a shearing force is applied, bending of the mounting plate 21 where the pin 24 and the locking portion 24L are connected does not occur.

On the bottom surface 21a (opposing surface to the base 14) of the mounting plate 21, abutting portions 35 and 36 capable of abutting the top surface (opposing surface to the mounting plate 21) of the base 14 at the time of mounting are arranged to protrude downward (the base 14 side) as shown in FIG. 3. The abutting portions 35 and 36 are preferably provided at three spots that are the central position in the long side direction in the mounting plate 21, and in the vicinities of both end positions. The abutting portions 35 and 36 are preferably formed to be bow-shaped in sectional shape, in other words, formed into a shape having an arc-shaped outer surface which bulges the most at a central portion with respect to the long side direction of the mounting plate 21. The respective abutting portions 35 and 36 are located at positions with the locking portions 22 therebetween, respectively, and in more detail, the central abutting portion 35 and the abutting portion 36 at the left end are placed at two positions with the locking portion 22 at the left side therebetween, and the central abutting portion 35 and the abutting portion 36 at the right end are placed at two positions with the locking portion 22 at the right side therebetween.

Among them, the central abutting portion 35 is also located at the central position with respect to the short side direction in the mounting plate 21, and preferably has a spherical crown shape capable of being in point contact with the base 14, as shown in FIGS. 3 and 5. The abutting portion 35 is disposed at the intermediate position between the two locking portions 22 arranged at the left and right in the bottom surface 21a of the mounting plate 21, is located on the back side of the lamp holding portion 23 at the center on the top surface side, and is disposed at the concentric position with the lamp holding portion 23.

Meanwhile, the abutting portions 36 at both ends each preferably has an embossed shape extending in the short side direction of the mounting plate 21, and are capable of being in line contact with the base 14 with respect to the same direction. Both the abutting portions 36 have the same length over the entire width of the mounting plate 21. Both the abutting portions 36 are preferably placed at positions further near to the ends from the lamp holding portions 23 at both ends in the mounting plate 21 and at positions equidistantly separated from both end positions of the mounting plate 21. On the bottom surface 21a of the mounting plate 21, the respective abutting portions 35 and 36 are disposed at the symmetrical positions and preferably have shapes that are symmetrical with each other.

A protruding amount of each of the abutting portions 35 and 36 from the mounting plate 21 is substantially the same and is set based on an error occurring in manufacturing the lamp clip 20. Specifically, due to an error in manufacture, a variation occurs in the distance between the locking surface 26a in the locking portion 22 and the bottom surface 21a of the mounting plate 21 for each product within the tolerance range due to an error in manufacture. The protruding amount of each of the abutting portions 35 and 36 is preferably set to be slightly larger than a value obtained by subtracting the plate thickness dimension of the base 14 from the maximum value of the tolerance range of the above described distance, namely, the maximum value of the clearance occurring between the mounting plate 21 and the base 14. Accordingly, the distance between the locking surface 26a of the locking portion 22 and the bottom surface 21a of the mounting plate 21 can be any value within the tolerance range when the lamp clip 20 is mounted to the base 14, each of the abutting portions 35 and 36 abuts the top surface of the base 14, and the mounting plate 21 is elastically deformed to be warped with the portions provided with the respective abutting portions 35 and 36 as the support points.

As shown in FIGS. 3 and 5, a positioning pin 37 capable of being fitted into a positioning hole 14b provided at the base 14 is preferably provided at a central position in the length direction in the abutting portion 36 at the left end. As is already described, while the locking portions 22 and the abutting portions 35 and 36 located on the back surface side (the opposing surface side to the base 14) of the lamp clip 20 are symmetrically arranged, the lamp holding portions 23 and the pin 24 on the front surface side are arranged asymmetrically, and therefore, may appear that the lamp clip 20 is mistakenly mounted to the base 14 in the inverted direction. However, the positioning pin 37 is fitted into the positioning hole 14b when the mounting plate 21 is oriented in the correct direction when mounting the lamp clip 20 to the base 14, but when the mounting plate 21 is oriented in the inverted direction, it is mismatched with the positioning hole 14b to be able to restrict mounting, and therefore, erroneous mounting can be prevented.

The present preferred embodiment preferably has the above structure, and its operation will be described subsequently. While the liquid crystal panel 11 is manufactured, an assembling operation of the backlight device 12 is performed. When assembling the backlight device 12, the operation of mounting each of the lamp clips 20 to the base 14 is performed first.

The pin 24 of the lamp clip 20 is gripped in the state shown in FIG. 3, and while each of the locking portions 22 is matched to each of the mounting holes 14a of the base 14 and the positioning pin 37 is matched to the positioning hole 14b respectively, the mounting plate 21 is pressed against the top surface of the base 14. Here, the left side locking portion 24L is disposed at the back side of the pin 24 gripped by an operator, and therefore, the locking portion 24L is easily positioned to the corresponding locking hole 14a. If the locking portion 24L is positioned, the right side locking portion 24R, and the positioning pin 37 can be naturally positioned to the corresponding locking hole 14a and the positioning hole 14b, and therefore, the subsequent insertion operation can be performed smoothly.

When the mounting plate 21 is pushed to the base 14 side, each of the locking portions 22 is inserted into each of the corresponding mounting holes 14a, and the positioning pin 37 is fitted into the positioning hole 14b. In the process in which the locking portion 22 is inserted into the mounting hole 14a, both the elastic locking pieces 26 are locked to the peripheral edge of the front side of the mounting hole 14a, and thereby, they are elastically deformed to be temporarily close to the base portion 25. In this process, the forces in the relatively opposite directions with respect to the up and down direction, namely shearing forces, are applied to the pin 24 by being pushed in by the operator, and the locking portion 22L is engaged with the peripheral edge at the front side of the mounting hole 14a. If large bending occurs to the mounting plate 21 by this force, the operational force to push in the pin 24 has to be made large correspondingly, and worsening of operability is caused. However, since in this preferred embodiment, the locking portion 22L is disposed at the back side of the pin 24, and bending does not occur to the mounting plate 21, favorable operability is obtained when the locking portion 24L is inserted into the mounting hole 14a. When the lamp clip 20 is removed from the base 14 by gripping the pin 24 in the reverse order from the above description, the same effect as described above is obtained.

Figure 7:
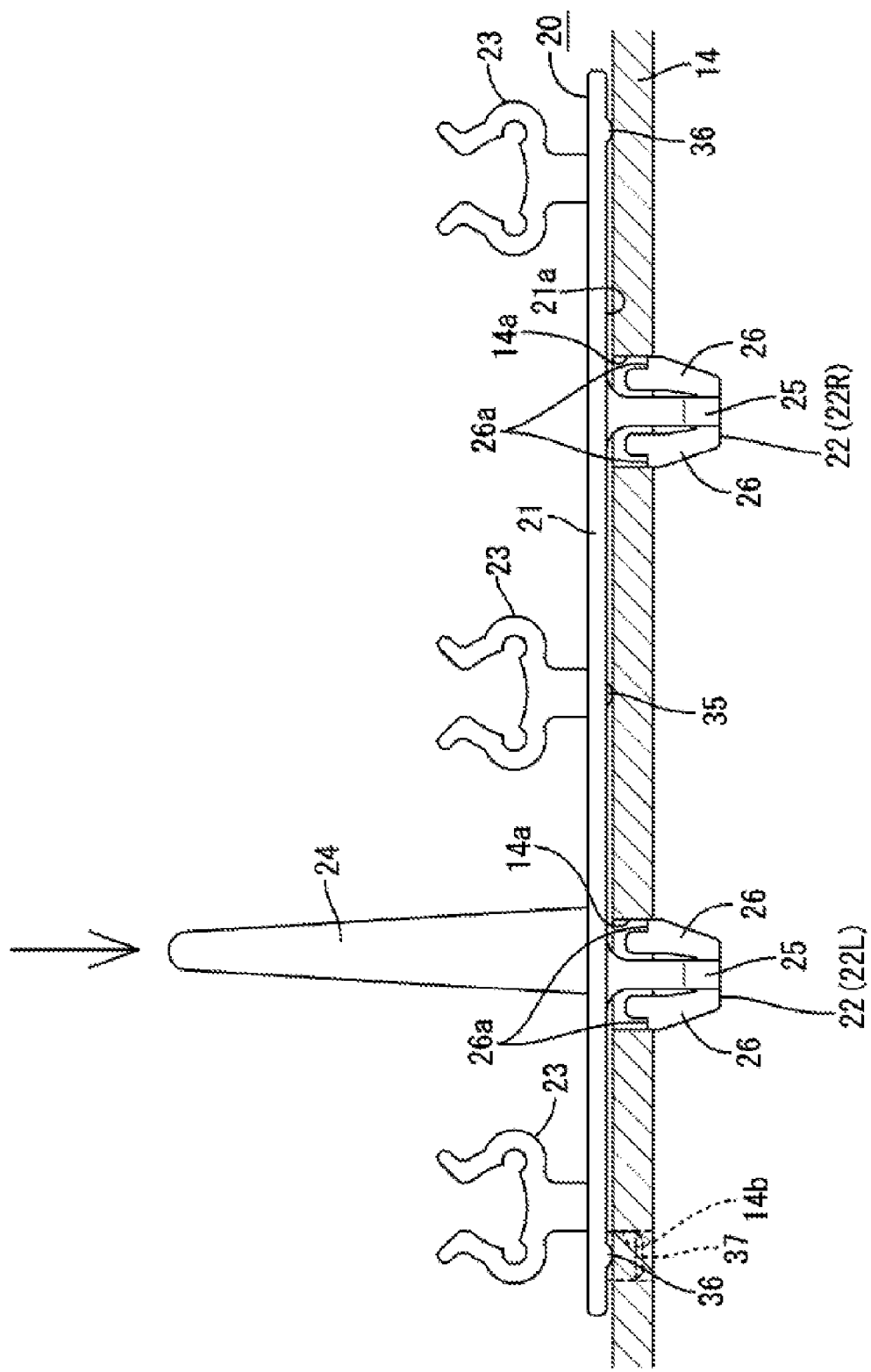
FIG. 7 is a sectional front view showing a state during mounting of the lamp clip to the base.

Then, when the mounting plate 21 is pushed into a predetermined depth, each of the abutting portions 35 and 36 abut the top surface of the base 14 as shown in FIG. 7. In this state, both the elastic locking pieces 26 remain to be elastically deformed, and the mounting plate 21 is at the position slightly raised from the base 14 to provide a clearance corresponding to the protruding amount of the abutting portions 35 and 36 between both the base 14 and the mounting plate 21. Then, when the mounting plate 21 is further pushed in, the mounting plate 21 is prevented from displacing in the pushing direction by the base 14 with respect to the portion where each of the abutting portions 35 and 36 is provided, and therefore, the portions sandwiched by the restricting regions are elastically deformed to be warped into the bow shape with the restricting regions as the support points. When the locking surfaces 26a of both the elastic locking pieces 26 reach the back side of the base 14, the elastic locking pieces 26 restore as shown in FIG. 8, and the locking surfaces 26a are locked to the peripheral edge of the back side of the mounting hole 14a. At this time, the base 14 is held by being sandwiched between the bottom surface 21a of the mounting plate 21 and the locking surface 26a of the elastic locking piece 26.

In this state, while the portion provided with each of the abutting portions 35 and 36 of the mounting plate 21 is supported at the position raised from the base 14, the portions provided with the locking portions 22 are elastically deformed to be warped to be close to the base 14 side, and therefore, both the locking portions 22 are elastically biased upward respectively, in the detaching direction. Accordingly, the locking surface 26a of each of the elastic locking pieces 26 is kept in close contact with the peripheral edge of the back side of the mounting hole 14a in the base 14 by the elastic force of the mounting plate 21, whereby the lamp clip 20 is held in the mounted state to the base 14 without rattling up and down. Then, the protruding amount of each of the abutting portions 35 and 36 is preferably larger than the maximum value of the clearance occurring between the mounting plate 21 and the base 14 due to an error in manufacture of the lamp clip 20. Therefore, even if the distance between the locking surface 26a of the elastic locking piece 26 and the bottom surface 21a of the mounting plate 21 varies to any value in the tolerance range due to an error occurring during manufacturing of the lamp clip 20, a warping degree (deformation amount) of the mounting plate 21 changes more or less. Yet, each of the abutting portions 35 and 36 abuts the top surface of the base 14 and the mounting plate 21 elastically deforms to be warped without fail, whereby the occurrence of rattling to the lamp clip 20 can be reliably prevented irrespective of an error in manufacture.

In this mounted state, both the abutting portions 36 located at both ends of the mounting plate 21 are in line contact with the top surface of the base 14 with respect to the short side direction of the mounting plate 21. Accordingly, the mounting plate 21 is mounted in the state partially raised from the base 14 by each of the abutting portions 35 and 36, but the raised portion of the mounting plate 21 can be prevented from rattling (displacing) to be inclined with respect to the short side direction by the clearance occurring in a space from the base 14.

After each of the lamp clips 20 is mounted to the base 14, the operation of mounting the cold-cathode tube 17 is subsequently performed. The cold-cathode tube 17 is held by the lamp clip 20 in the state in which two of them are made one set by attaching the holders 18 at both end portions thereof as shown in FIG. 1.

When the cold-cathode tube 17 is pushed downward while being guided by both the guide portions 29 of the lamp holding portion 23 and while being guided by both guide portions 29 of the lamp holding portion 23, both the arm portions 27 elastically deform to open with the root side regions where the recessed portions 34 are provided as the support points, and the clearance between both the tip end portions is widened, whereby entry of the cold-cathode tube 17 is allowed. Then, when the cold-cathode tube 17 passes between the tip end portions of both the arm portions 27, both the arm portions 27 close to predetermined positions and each of the point contact portions 32 and 33 contacts the peripheral surface of the cold-cathode tube 17, whereby the cold-cathode tube 17 is supported at three points. Although the thickness of the cold-cathode tube 17 increases and decreases within the tolerance range due to an error in manufacture, the recessed portions 34 are provided at the opposing surfaces to the cold-cathode tube 17 in both the arm portions 27, and therefore, an elastic force occurring to both the arm portions 27 is reduced. Accordingly, the relatively slim cold-cathode tube 17 can be held without rattling, the operation force required for attaching and detaching the relatively thick cold-cathode tube 17 can be reduced, and it is made difficult for the cold-cathode tube 17 to be pushed out to the detaching direction by the elastic force of the arm portion 27 in the held state. Thus, favorable operability and holding performance can be obtained.

After all the cold-cathode tubes 17 are mounted as described above, the lamp holder 19 is mounted, and the optical member 15 and the frame 16 are assembled to the base 14 in this sequence, whereby the backlight device 12 is formed. In this state, the diffusion plate 15a disposed at the lowermost side of the optical member 15 (the side closest to the cold-cathode tube 17) has its peripheral edge portion supported by the base 14, and the inner portion from the peripheral edge portion is supported by the pin 24 of each of the lamp clips 20 as shown in FIG. 2. Thereby, the diffusion plate 15a is prevented from hanging down and displacing in the horizontal direction. By integrally assembling the backlight device 12 and the liquid crystal panel 11 by the bezel 13, the liquid crystal display device 10 is formed (see FIG. 1).

As described above, according to this preferred embodiment, the locking portion 22L is disposed at the position corresponding to the back side of the pin 24 in the mounting plate 21, and as compared with the conventional lamp clip in which both of them are deviated, both the locking portion 22L and the mounting hole 14a are easily positioned when the locking portion 22L is inserted into the mounting hole 14a while the pin 24 is gripped, and bending of the mounting plate 21 hardly occurs at the time of insertion. Thereby, operability can be enhanced.

Since the locking portion 22L is disposed to partially overlap the pin 24 with respect to the surface direction of the mounting plate 21, occurrence of bending in the mounting plate 21 is reliably prevented when the locking portion 22L is inserted into the mounting hole 14a, and more favorable operability is provided.

Since the pin 24 is capable of abutting the optical member 15 arranged to be opposed to the cold-cathode tube 17, it can have the function of shape holding, position holding and the like of the optical member 15 in addition to the gripping function at the time of attaching and detaching, and therefore, the structure of the lamp clip 20 can be simplified.

The pin 24 preferably has the tapering shape decreasing in the diameter dimension as it separates from the cold-cathode tube 17, and therefore, light emitted from the cold-cathode tube 17 can be prevented from being shielded by the pin 24 as much as possible. Thereby, when the cold-cathode tube 17 is lit and the liquid crystal display device 10 is displayed, it is difficult for the pin 24 to be visually recognized by a viewer (reduction in luminance or the like is prevented), and therefore, display performance of the liquid crystal display device 10 becomes favorable.

Since the lamp clip 20 is preferably made of a synthetic resin, manufacture is facilitated, and reduction in cost can be achieved.

Since the front surface of the lamp clip 20 is preferably made white, it is rare that the lamp clip 20 itself shields and reflects the light emitted from the cold-cathode tube 17 as compared with the case where the lamp clip is made black. Thereby, when the cold-cathode tube 17 is lit to cause the liquid crystal display device 10 to display, it is difficult for the pin 24 to be visually recognized by a viewer (reduction in luminance or the like is prevented), and therefore, display performance of the liquid crystal display device 10 becomes favorable.

The present invention is not limited to preferred embodiments according to the aforementioned description and drawings, and, for example, the following other preferred embodiments and modifications thereof are also included in the technical scope of the present invention.

Figure 9A:
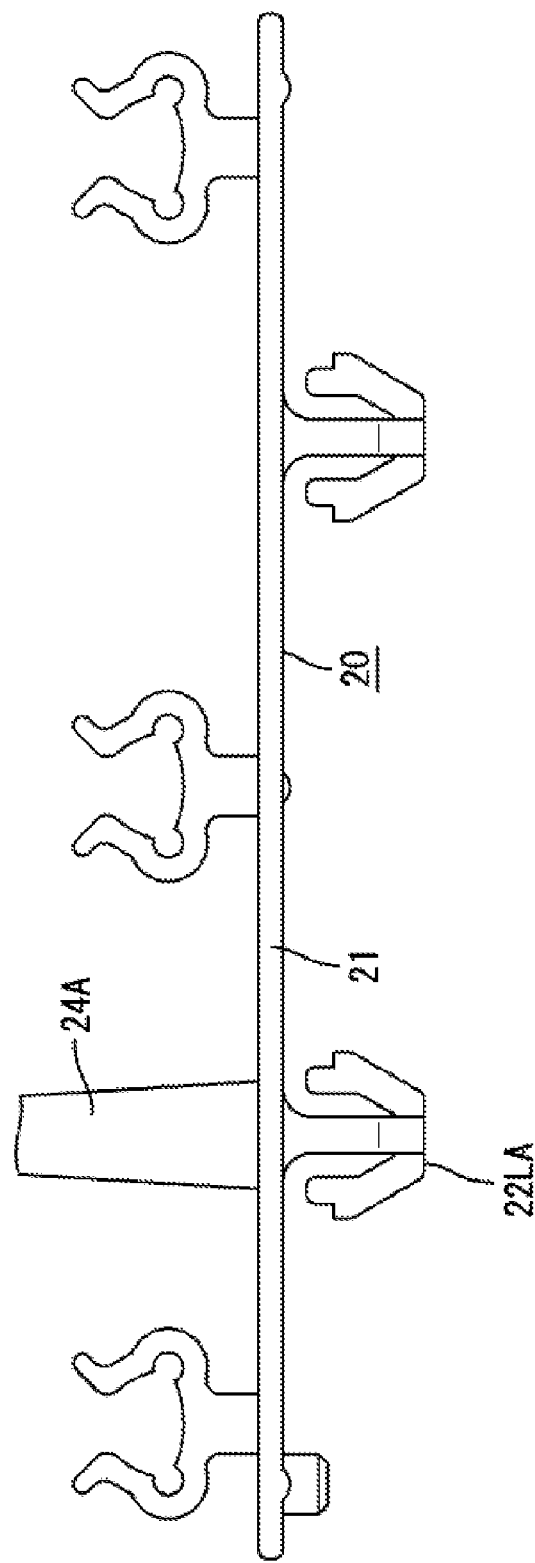
FIG. 9A is a bottom view showing a lamp clip according to another preferred embodiment of the present invention.
Figure 9B:
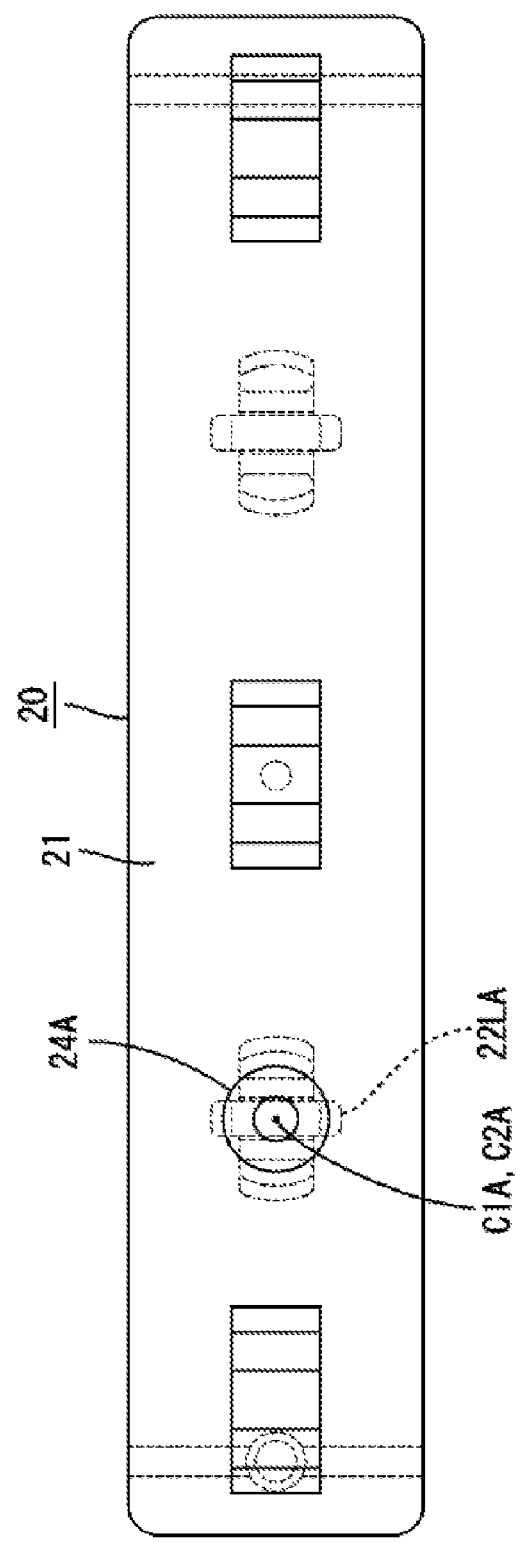
FIG. 9B is a plan view showing a lamp clip according to another preferred embodiment of the present invention.

The above described preferred embodiment shows the lamp clip in which the center points C1 and C2 of the pin 24 and the locking portion 22L are slightly deviated, but as shown in, for example, FIG. 9A and FIG. 9B, the lamp clip in which the center points C1A and C2A of the pin 24A and the locking portion 22LA are disposed in the same position with respect to the surface direction of the mounting plate 21, that is, both 24A and 24LA are disposed to be concentric, is included in the present invention. Thereby, the locking portion 24LA is more easily positioned to the mounting hole 14a, and operability can be further enhanced.

Figure 10A:
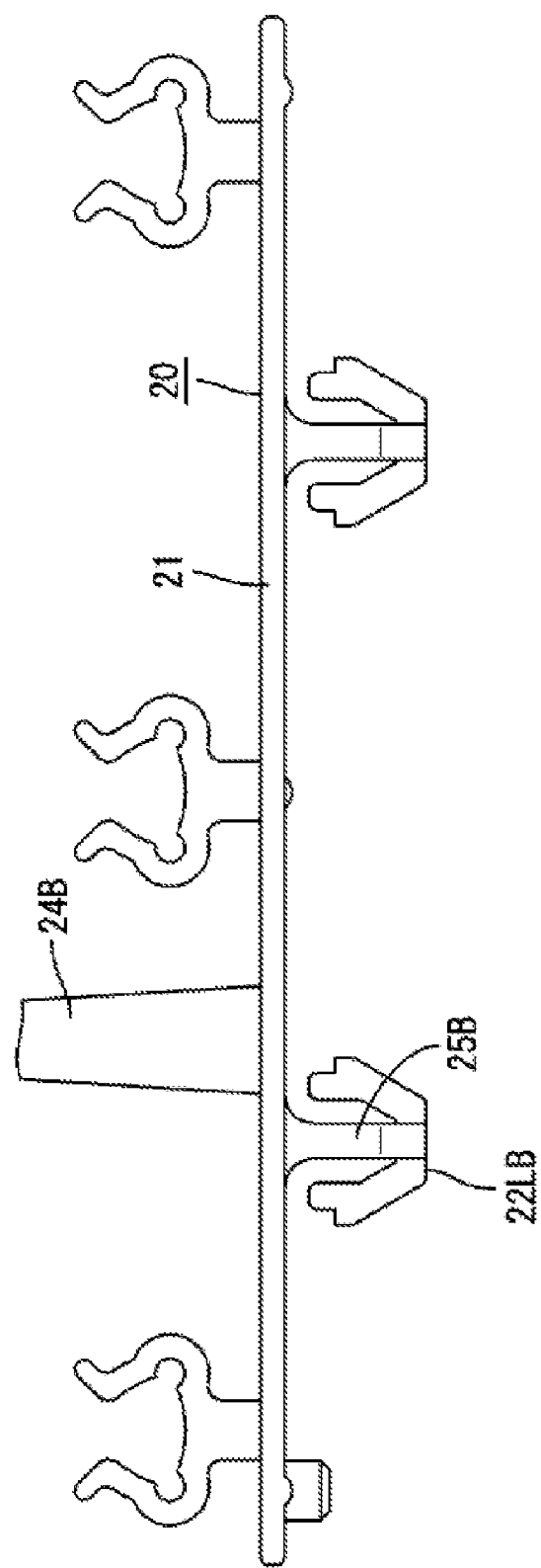
FIG. 10A is a bottom view showing a lamp clip according to another preferred embodiment of the present invention.
Figure 10B:
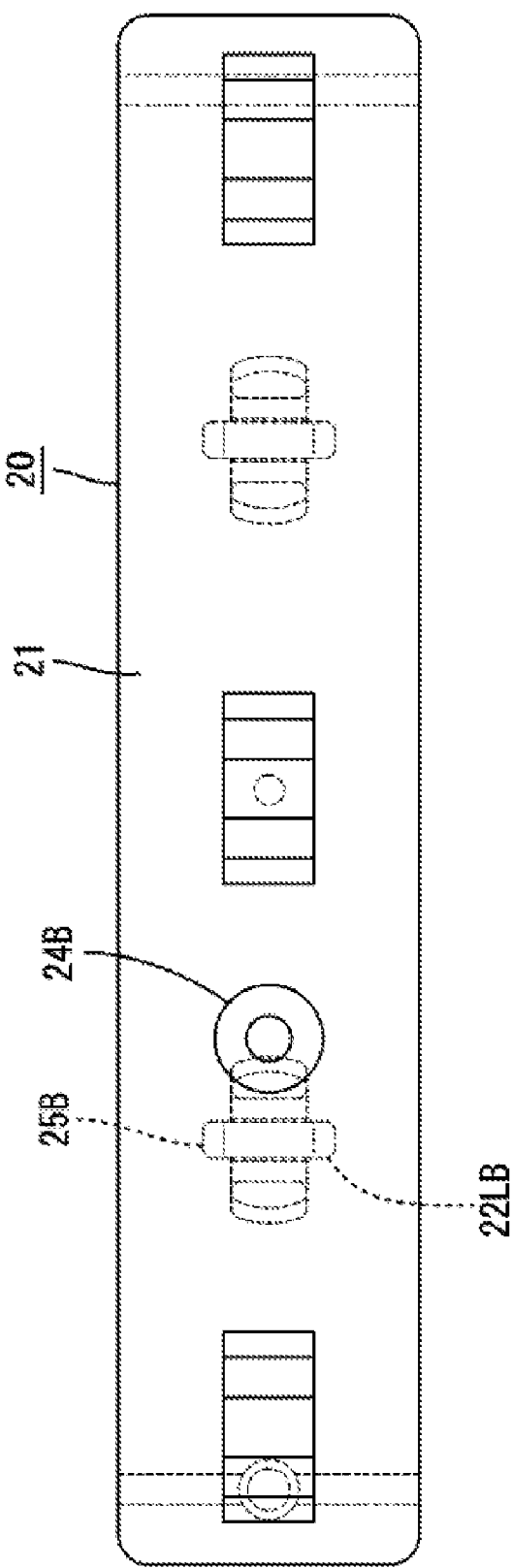
FIG. 10B is a bottom view showing a lamp clip according to another preferred embodiment of the present invention.

The above described preferred embodiment shows the lamp clip in which the pin 24 is disposed to overlap the base portion 25 of the locking portion 22L with respect to the long side direction of the mounting plate 21, but as shown in, for example, FIGS. 10A and 10B, the lamp clip in which a pin 24B is disposed to be deviated from a base portion 25B of the locking portion 22LB with respect to the long side direction of the mounting plate 21 is also included in the present invention. In this case, there is the possibility that bending of the mounting plate 21 occurs when the locking portion 22LB is inserted into the mounting hole 14a, but the bending is very small, and is so slight that the influence on the operability can be ignored. Even if the pin 24B and the locking portion 24LB are further deviated beyond what is shown in FIGS. 10A and 10B, they are included in the present invention if only both of them are at the positions in the vicinity of each other, and the bending of the mounting plate can be allowed to such a degree so as not to exert an adverse effect on operability.

The lamp clip in which the pin 24 and the locking portion 22L are disposed to be displaced with respect to the short side direction of the mounting plate 21 is also included in the present invention.

In addition to the pin 24 corresponding to the back side of the locking portion 22L at the left side, a pin may be provided at a position corresponding to a back side of the locking portion 22R at the right side, or in the vicinity of the position. As for the number of pins, three or more is also included in the present invention. Further, the numbers of the locking portions 22 and the lamp holding portions 23 are also changeable optionally.

The shape of the pin 24 may be, for example, a pyramid shape other than the conical shape. Further, it is not always necessary to form the pin 24 to have the tapering shape as described above, and it may be formed into a columnar shape or a square column shape, for example. The thickness and height of the pin 24 are also changeable optionally.

The above described preferred embodiment includes the case where the pin 24 abuts the diffusion plate 15a of the optical member 15, but the lamp clip which abuts any of the other optical members (diffusion sheet 15b, the lens sheet 15c and the optical sheet 15d) is also included in the present invention.

The pin 24 may not always abut the optical member 24, and the pin 24 including only the gripping function at the attaching and detaching time is also included in the present invention.

The shape of the mounting plate 21 is not limited to the substantially rectangular shape, and the mounting plates having a substantially square shape and a substantially circular shape are included in the present invention.

The above described preferred embodiment preferably uses the cold-cathode tube 17 as a lamp, but modes using the other kinds of lamps such as a hot-cathode tube, for example, are included in the present invention.

The above described preferred embodiment includes the backlight device 12 in which the lamp clip 20 is mounted to the substantially box-shaped base 14, but a mode in which the lamp clip 20 is mounted to the planar base from which a peripheral wall is removed, for example, is also included in the present invention.

The above described preferred embodiment includes the lamp clip 20 being made white, but the lamp clip 20 may be made colorless and transparent, or semitransparent and semiopaque. In doing so, the lamp clip 20 easily transmits light emitted from the cold-cathode tube 17, and it becomes more difficult to happen that light is shielded and reflected. Thereby, when the cold-cathode tube 17 is lit to cause the liquid crystal display device 10 to display, it is difficult for the pin 24 to be visually recognized by a viewer (reduction in luminance or the like is prevented), and therefore, the display performance of the liquid crystal display device 10 becomes more favorable. As for the color of the lamp clip 20, the colors except for the above described color are also included in the present invention.

The above described preferred embodiment includes the lamp clip 20 being made of a synthetic resin material and polycarbonate, but synthetic resin material other than this may be used. As the material of the lamp clip 20, it is possible to use the other kinds of materials without being limited to the synthetic resin material. When the synthetic resin material other than polycarbonate and the material other than the synthetic material are used, the color of the lamp clip 20 can be made any of white, colorless and transparent, and semitransparent and semi-opaque.

The present invention is also applicable to the liquid crystal display device using a switching element other than the TFT. The present invention is also applicable to the liquid crystal display device performing black and white display other than the liquid crystal display device which performs color display.

The above described preferred embodiments relate to the liquid crystal display device, but the present invention is also applicable to the other display devices using a backlight device other than liquid crystal devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lamp holding apparatus for mounting a lamp to a lamp mounting member including a base, the lamp holding apparatus comprising:
   a mounting plate which is to be mounted to said base of said lamp mounting member at a first surface of said mounting plate;
   a plurality of lamp holding portions provided on a second surface of said mounting plate opposite to said first surface to hold at least one lamp;
   a gripping portion located on said second surface of said mounting plate and between said lamp holding portions, having a greater height dimension measured from said mounting plate than the lamp holding portions, and arranged to be gripped by an operator at a time of attaching and detaching the mounting plate to the base of said lamp mounting member; and
   a locking portion which protrudes from said first surface of said mounting plate and is inserted into a mounting hole provided in the lamp mounting member to be lockable to a peripheral edge of a rear surface of the lamp mounting member, the locking portion and the mounting plate defined by a single monolithic element and including a base portion and a pair of elastic pieces extending diagonally upward from an end of the base portion, the pair of elastic pieces arranged to engage inner surfaces of the mounting hole; wherein
   said locking portion and said gripping portion are disposed opposite to each other with the mounting plate disposed therebetween, and said locking portion and said gripping portion are located closer to each other in a lateral direction extending along the first and second surfaces of the mounting plate than a location of said locking portion relative to a closest one of said plurality of lamp holding portions.

2. The lamp holding apparatus according to claim 1, wherein said locking portion is arranged to at least partially overlap said gripping portion with respect to a vertical direction that is substantially perpendicular to said lateral direction.

3. The lamp holding apparatus according to claim 2, wherein said gripping portion is arranged to be capable of abutting an optical member disposed to be opposite to said at least one lamp.

4. The lamp holding apparatus according to claim 2, wherein said gripping portion has a pin shape.

5. The lamp holding apparatus according to claim 2, wherein said gripping portion has a tapered shape.

6. The lamp holding apparatus according to claim 2, wherein said lamp holding apparatus is made of a synthetic resin and has a white surface.

7. The lamp holding apparatus according to claim 1, wherein said locking portion is concentric with said gripping portion.

8. The lamp holding apparatus according to claim 7, wherein said gripping portion is arranged to be capable of abutting an optical member disposed to be opposite to said at least one lamp.

9. The lamp holding apparatus according to claim 7, wherein said gripping portion has a pin shape.

10. The lamp holding apparatus according to claim 7, wherein said gripping portion has a tapered shape.

11. The lamp holding apparatus according to claim 7, wherein said lamp holding apparatus is made of a synthetic resin and has a white surface.

12. The lamp holding apparatus according to claim 1, wherein said gripping portion is arranged to be capable of abutting an optical member disposed to be opposite to said at least one lamp.

13. The lamp holding apparatus according to claim 1, wherein said gripping portion has a pin shape.

14. The lamp holding apparatus according to claim 1, wherein said gripping portion has a tapered shape.

15. The lamp holding apparatus according to claim 1, wherein said lamp holding apparatus is made of a synthetic resin and has a white surface.

16. The lamp holding apparatus according to claim 1, wherein each of the pair of elastic pieces includes a stepped locking surface arranged to engage the inner surface of the mounting hole.

17. A backlight device, comprising:
   the lamp holding apparatus of claim 1; and
   at least one lamp.

18. A display device, comprising:
   the backlight device of claim 17; and
   a display panel.

19. A liquid crystal display device, comprising:
   the backlight device of claim 17; and
   a liquid crystal panel.

20. A liquid crystal display device, comprising:
   a lamp mounting member including a base;
   a lamp holding apparatus including:
      a mounting plate mounted to said base of said lamp mounting member at a first surface of said mounting plate;
      a plurality of lamp holding portions provided on a second surface of said mounting plate opposite to said first surface to hold at least one lamp;

a gripping portion located on said second surface of said mounting plate and between said lamp holding portions, having a greater height dimension measured from said mounting plate than the lamp holding portions, and arranged to be gripped by an operator at a time of attaching and detaching the mounting plate to the base of said lamp mounting member; and a locking portion which protrudes from said first surface of said mounting plate and is inserted into a mounting hole provided in the lamp mounting member to be lockable to a peripheral edge of a rear surface of the lamp mounting member, the locking portion and the mounting plate defined by a single monolithic element and including a base portion and a pair of elastic pieces extending diagonally upward from an end of the base portion, the pair of elastic pieces arranged to engage inner surfaces of the mounting hole; and a liquid crystal panel which transmits light from said at least one lamp held in the plurality lamp holding portions; wherein said locking portion and said gripping portion are disposed opposite to each other with the mounting plate disposed therebetween, and said locking portion and said gripping portion are located closer to each other in a lateral direction extending along the first and second surfaces of the mounting plate than a location of said locking portion relative to a closest one of said plurality of lamp holding portions.

21. The liquid crystal display device according to claim 20, wherein said locking portion is arranged to at least partially overlap said gripping portion with respect to a vertical direction that is substantially perpendicular to said lateral direction.

22. The lamp holding apparatus according to claim 20, wherein each of the pair of elastic pieces includes a stepped locking surface arranged to engage the inner surface of the mounting hole.

23. A lamp holding apparatus for mounting a lamp to a lamp mounting member including a base, the lamp holding apparatus comprising:
    a mounting plate which is to be mounted to said base of said lamp mounting member at a first surface of said mounting plate;
    a plurality of lamp holding portions provided on a second surface of said mounting plate opposite to said first surface to hold at least one lamp;
    a gripping portion located on said second surface of said mounting plate and between said lamp holding portions, having a greater height dimension measured from said mounting plate than the lamp holding portions, and arranged to be gripped by an operator at a time of attaching and detaching the mounting plate to the base of said lamp mounting member; and
    a locking portion which protrudes from said first surface of said mounting plate and is inserted into a mounting hole provided in the lamp mounting member to be lockable to a peripheral edge of a rear surface of the lamp mounting member, the locking portion and the mounting plate defined by a single monolithic element, the locking portion including a base portion extending from the mounting plate and a pair of elastic locking pieces extending diagonally upward from an end of the base portion; wherein said locking portion and said gripping portion are disposed opposite to each other with the mounting plate disposed therebetween, and said locking portion is arranged to at least partially overlap said gripping portion with respect to a vertical direction that is substantially perpendicular to said first and second surfaces of said mounting plate.

24. The lamp holding apparatus according to claim 23, wherein each of the pair of elastic pieces includes a stepped locking surface arranged to engage an inner surface of the mounting hole.

25. A liquid crystal display device, comprising:
    a lamp mounting member including a base;
    a lamp holding apparatus including:
        a mounting plate mounted to said base of said lamp mounting member at a first surface of said mounting plate;
        a plurality of lamp holding portions provided on a second surface of said mounting plate opposite to said first surface to hold at least one lamp;
        a gripping portion located on said second surface of said mounting plate and between said lamp holding portions, having a greater height dimension measured from said mounting plate than the lamp holding portions, and arranged to be gripped by an operator at a time of attaching and detaching the mounting plate to the base of said lamp mounting member; and
        a locking portion which protrudes from said first surface of said mounting plate and is inserted into a mounting hole provided in the lamp mounting member to be lockable to a peripheral edge of a rear surface of the lamp mounting member, the locking portion and the mounting plate defined by a single monolithic element, the locking portion including a base portion extending from the mounting plate and a pair of elastic locking pieces extending diagonally upward from an end of the base portion; and
    a liquid crystal panel which transmits light from said at least one lamp held in the plurality lamp holding portions; wherein said locking portion and said gripping portion are disposed opposite to each other with the mounting plate disposed therebetween, and said locking portion is arranged to at least partially overlap said gripping portion with respect to a vertical direction that is substantially perpendicular to said first and second surfaces of said mounting plate.

26. The lamp holding apparatus according to claim 25, wherein each of the pair of elastic pieces includes a stepped locking surface arranged to engage an inner surface of the mounting hole.

* * * * *